US009769333B2

United States Patent
Miyazawa

(10) Patent No.: US 9,769,333 B2
(45) Date of Patent: Sep. 19, 2017

(54) SERVER FOR COLLECTING STATUS INFORMATION OF IMAGE FORMING DEVICES

(71) Applicant: BROTHER KOGYO KABUSHIKI KAISHA, Nagoya-shi, Aichi-ken (JP)

(72) Inventor: Masafumi Miyazawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/828,582

(22) Filed: Aug. 18, 2015

(65) Prior Publication Data
US 2016/0057295 A1 Feb. 25, 2016

(30) Foreign Application Priority Data
Aug. 22, 2014 (JP) .................................. 2014-169082

(51) Int. Cl.
*H04N 1/00* (2006.01)
*H04N 1/32* (2006.01)

(52) U.S. Cl.
CPC ..... *H04N 1/00244* (2013.01); *H04N 1/32117* (2013.01); *H04N 2201/0094* (2013.01); *H04N 2201/3205* (2013.01)

(58) Field of Classification Search
CPC ........... H04N 1/00244; H04N 1/32117; H04N 1/00344; G03G 15/5079
See application file for complete search history.

(56) References Cited

U.S. PATENT DOCUMENTS

| 8,953,954 B2* | 2/2015 | Sawada | G03G 15/55 399/10 |
| 2002/0113991 A1* | 8/2002 | Borg | G06K 15/00 358/1.15 |
| 2002/0131784 A1* | 9/2002 | Takemoto | G03G 15/5075 399/12 |
| 2005/0144275 A1* | 6/2005 | Shima | G06F 3/1204 709/224 |

(Continued)

FOREIGN PATENT DOCUMENTS

JP 2001-347734 A 12/2001
JP 2002-278379 A 9/2002

*Primary Examiner* — Benjamin O Dulaney
(74) *Attorney, Agent, or Firm* — Scully, Scott, Murphy & Presser, PC

(57) ABSTRACT

A server includes: a storage; and a control device which determines whether the server is permitted to collect data of the image forming device when receiving inquiry information; transmits to the image forming device first permission information for checking whether a user permits data collection; transmits active information when receiving second permission information representing that data collection is permitted; when the server receives device identification information for identifying the image forming device of which data collecting function is activated, stores the received device identification information in the storage, and transmits instruction information for instructing the image forming device to transmit the data which should be collected, to the image forming device; and when receiving the collection data for generating the notification data from the image forming device, stores the received collection data in the storage in association with the device identification information.

14 Claims, 9 Drawing Sheets

(56) References Cited

U.S. PATENT DOCUMENTS

| | | | |
|---|---|---|---|
| 2006/0066900 A1* | 3/2006 | Abe | G03G 15/5075 358/1.15 |
| 2006/0277446 A1* | 12/2006 | Ikeno | H04N 1/00244 714/47.3 |
| 2008/0062883 A1* | 3/2008 | Shima | G06F 11/006 370/241 |
| 2008/0243606 A1* | 10/2008 | Snyder | G06Q 10/0637 705/14.17 |
| 2009/0295849 A1* | 12/2009 | Ito | B41J 2/17566 347/7 |
| 2011/0238704 A1* | 9/2011 | Koike | G06Q 10/08 707/802 |
| 2011/0279857 A1* | 11/2011 | Hirahara | G06F 11/3013 358/1.15 |
| 2013/0141743 A1* | 6/2013 | Miyazawa | H04N 1/00095 358/1.13 |
| 2014/0074962 A1* | 3/2014 | Kano | G06F 17/30902 709/213 |
| 2015/0181061 A1* | 6/2015 | Miyazawa | H04N 1/00474 358/1.14 |
| 2015/0350204 A1* | 12/2015 | Wang | H04L 63/0876 726/9 |

* cited by examiner

FIG.3A

| DEVICE ID | PERMISSION FLAG |
|---|---|
| 001 | PERMISSION OK |
| 002 | WAITING FOR PERMISSION |
| 003 | PERMISSION NG |
| ⋮ | ⋮ |

FIG.3B

| DEVICE ID | FIRST IDENTIFICATION INFORMATION | FIRST COLLECTION DATA | FIRST DATE/TIME INFORMATION |
|---|---|---|---|
| 001 | AAA | ABC | YYYYMMDD |
| 002 | AAA | DEF | yyyymmdd |
| ⋮ | ⋮ | ⋮ | ⋮ |

FIG.3C

| DEVICE ID | SECOND IDENTIFICATION INFORMATION | SECOND COLLECTION DATA | SECOND DATE/TIME INFORMATION |
|---|---|---|---|
| 001 | XXX | GHI | YYYYMMDD |
| 002 | YYY | JKL | yyyymmdd |
| ⋮ | ⋮ | ⋮ | ⋮ |

SERVER FOR COLLECTING STATUS INFORMATION OF IMAGE FORMING DEVICES

CROSS REFERENCE TO RELATED APPLICATION

This application is based upon and claims the benefit of priority of Japanese Patent Application No. 2014-169082 filed on Aug. 22, 2014, the contents of which are incorporated herein by reference in its entirety.

BACKGROUND

The present disclosure relates to a server for collecting collection data from an image forming device in order to generate notification data to be transmitted to the corresponding image forming device.

In the related art, there is known a server for collecting data from an image forming device and generating a notification based on the collected data, and transmitting the notification to the image forming device. For example, such a system is known in which a server acquires an integrated value of ink usage from a printer which is an image forming device and provides a service for instructing the printer to print a coupon image according to the corresponding integrated value.

In the above described system, in order to collect data from the image forming device, it is required to obtain permission for data collection from a user of the corresponding image forming device. Further, it is known that an authentication operation is performed through a PC connected to the server. However, there is a problem that if users are requested to go through the complicated procedure at the stage where they do not clearly recognize the merits of that service, use of the corresponding service does not spread.

SUMMARY

An aspect of the present disclosure was made in view of the above described circumstances, and an object of the aspect of the present disclosure is to provide a server which performs a simple procedure of permitting data collection at an appropriate timing.

The aspect of the present disclosure provides the following arrangements:

A server comprises: a communication unit configured to perform communication with an image forming device through the Internet; a storage; and a control device configured to execute: a first receiving process of receiving inquiry information related to acquisition of notification data, from the image forming device through the communication unit; a determination process of determining whether the server is permitted to collect a collection data of the image forming device when the server receives the inquiry information, the collection data being necessary for generating the notification data; a first transmitting process of transmitting, to the image forming device through the communication unit, first permission information for checking whether a user of the image forming device permits data collection when it is determined that the server is not permitted to collect data; a second receiving process of receiving second permission information representing that data collection is permitted, from the image forming device through the communication unit; a second transmitting process of transmitting active information for activating a data collecting function of the image forming device to the image forming device through the communication unit when the server receives the second permission information; a third receiving process of receiving device identification information for identifying the image forming device, from the image forming device through the communication unit, the image forming device is destination of the active information, the data collecting function of the image forming device is activated; a third transmitting process of storing the received device identification information in the storage, and transmitting, to the image forming device through the communication unit, instruction information for instructing the image forming device to transmit the data which should be collected by the data collecting function; a fourth receiving process of receiving the collection data from the image forming device through the communication unit; and a storage control process of storing the received the collection data in the storage in association with the device identification information when the server receives the collection data according to the fourth receiving process.

An image forming device comprises: a communication unit configured to perform communication with a server on the Internet; a display unit configured to display an image; an operation unit configured to receive an operation of a user; and a control device configured to execute: a first receiving process of receiving, by the operation unit, the operation of the user regarding acquisition of notification data which is generated based on collection data collected from the image forming device; an inquiring process of transmitting inquiry information regarding the acquisition of the notification data to the server through the communication unit when the operation is received by the operation unit according to the first receiving process; a second receiving process of receiving, by the image forming device, from the server through the communication unit, first permission information for checking whether the user of the image forming device permits data collection; a display control process of controlling the display unit to display a permission receiving screen for prompting the user to perform a user's operation to permit data collection when the first permission information is received according to the second receiving process; a third receiving process of receiving, by the operation unit, the user's operation to permit data the collection; a permission confirming process of transmitting, to the server through the communication unit, second permission information representing that data collection is permitted when the user's operation is received according to the third receiving process; a fourth receiving process of receiving, by the image forming device, from the server through the communication unit, active information for activating a data collecting function; a requesting process of transmitting, to the server through the communication unit, request information including device identification information for identifying the image forming device when the active information is received according to the fourth receiving process; a fifth receiving process of receiving, from the server through the communication unit, instruction information for instructing the image forming device to transmit data which should be collected, as a response to the request information; and a collecting process of transmitting collection data collected from the image forming device, to the server through the communication unit.

A non-transitory computer readable recording medium storing a program which is executable by a computer having a storage and a communication unit for performing communication with an image forming device through an Internet, the program causing the computer to execute: a first receiving process of receiving, by the server, inquiry information related to acquisition of notification data from the image forming device through the communication unit; a determination process of determining whether the server is permitted to collect data of the image forming device when the inquiry information is received according to the first receiving process; a first transmitting process of transmitting, to the image forming device through the communication unit, first permission information for checking whether a user of the image forming device permits data collection when it is determined that the server is not permitted to collect data; a second receiving process of receiving, by the server from the image forming device through the communication unit, second permission information representing that data collection is permitted; a second transmitting process of transmitting active information for activating a data collecting function of the image forming device to the image forming device through the communication unit when the second permission information is received according to the second receiving process; a third receiving process of receiving, the server, device identification information for identifying the image forming device of which data collecting function is activated from the image forming device through the communication unit; a third transmitting process of storing the received device identification information in the storage, and transmitting instruction information for instructing the image forming device to transmit the data which should be collected, to the image forming device through the communication unit when the device identification information is received by the third receiving process; a fourth receiving process of receiving the collection data for generating the notification data from the image forming device through the communication unit by the server; and a storage control process of storing the received collection data in the storage in association with the device identification information when the collection data is received according to the fourth receiving process.

A communication system comprises: an image forming device including an operation unit for receiving operations of a user, a first communication unit, a first control device, and a server including a storage, a second communication unit configured to communicate with the first communication unit through the Internet; and a second control device. The first control device is configured to execute: a first receiving process of receiving, by the operation unit, the operation of the user regarding acquisition of notification data which is generated based on collection data collected from the image forming device; an inquiring process of transmitting inquiry information regarding the acquisition of the notification data to the server through the communication unit when the operation is received according to the first receiving process; a second receiving process of receiving, by the image forming device, from the server through the communication unit, first permission information for checking whether the user of the image forming device permits data collection; a display control process of controlling the display unit to display a permission receiving screen for prompting the user to perform a user's operation to permit data collection when the first permission information is received according to the second receiving process; a third receiving process of receiving, by the operation unit, the user's operation to permit data the collection; a permission confirming process of transmitting, to the server through the communication unit, second permission information representing that data collection is permitted when the user's operation is received according to the third receiving process; a fourth receiving process of receiving, by the image forming device, from the server through the communication unit, active information for activating a data collecting function; a requesting process of transmitting, to the server through the communication unit, request information including device identification information for identifying the image forming device when the active information is received by the fourth receiving process; a fifth receiving process of receiving, from the server through the communication unit, instruction information for instructing the image forming device to transmit data which should be collected, as a response to the request information; and a collecting process of transmitting collection data collected from the image forming device, to the server through the communication unit. The second control device is configured to execute: a sixth receiving process of receiving, by the server, the inquiry information from the image forming device through the second communication unit; a determining process of determining whether the server is permitted to collect data of the image forming device when the inquiry information is received by the sixth receiving process; when it is determined that the server is not permitted to collect data, a first transmitting process of transmitting the first permission information to the image forming device through the second communication unit; a seventh receiving process of receiving, by the server, the second permission information from the image forming device through the second communication unit; a second transmitting process of transmitting the active information to the image forming device through the second communication unit when the second permission information is received by the seventh receiving process; an eighth receiving process of receiving, by the server, the request information from the image forming device through the second communication unit; a third transmitting process of storing in the storage the device identification information included in the request information and transmitting the instruction information to the image forming device through the second communication unit when the request information is received according to the eighth information; a ninth receiving process of receiving, by the server, the collection data from the image forming device through the second communication unit; and a storing control process of storing the received collection data in association with the device identification information in the storage when the collection data is received according to the ninth receiving process.

BRIEF DESCRIPTION OF DRAWINGS

FIGS. 3A to 3C show examples of information items which are stored in a storage 32 of the multi-function device 10. More specifically, FIG. 3A shows the correspondence relation of device IDs and permission flags, and FIG. 3B shows the correspondence relation of device IDs, first identification information items, first collection data items, and first date/time information items, and FIG. 3C shows the correspondence relation of device IDs, second identification information items, second collection data items, and second date/time information items.

FIG. 8A shows a notification confirmation screen, and FIG. 8B shows a menu screen.

FIG. 8A shows a permission receiving screen, and FIG. 8B shows a notification screen.

DESCRIPTION OF ILLUSTRATIVE EMBODIMENTS

Hereinafter, an embodiment of the present disclosure will be described with reference to appropriate drawings. It goes without saying that the embodiment to be described below is just an example of one aspect of the present disclosure and the embodiment of the present disclosure can be appropriately modified without changing the scope of the present disclosure.

Figure 1:
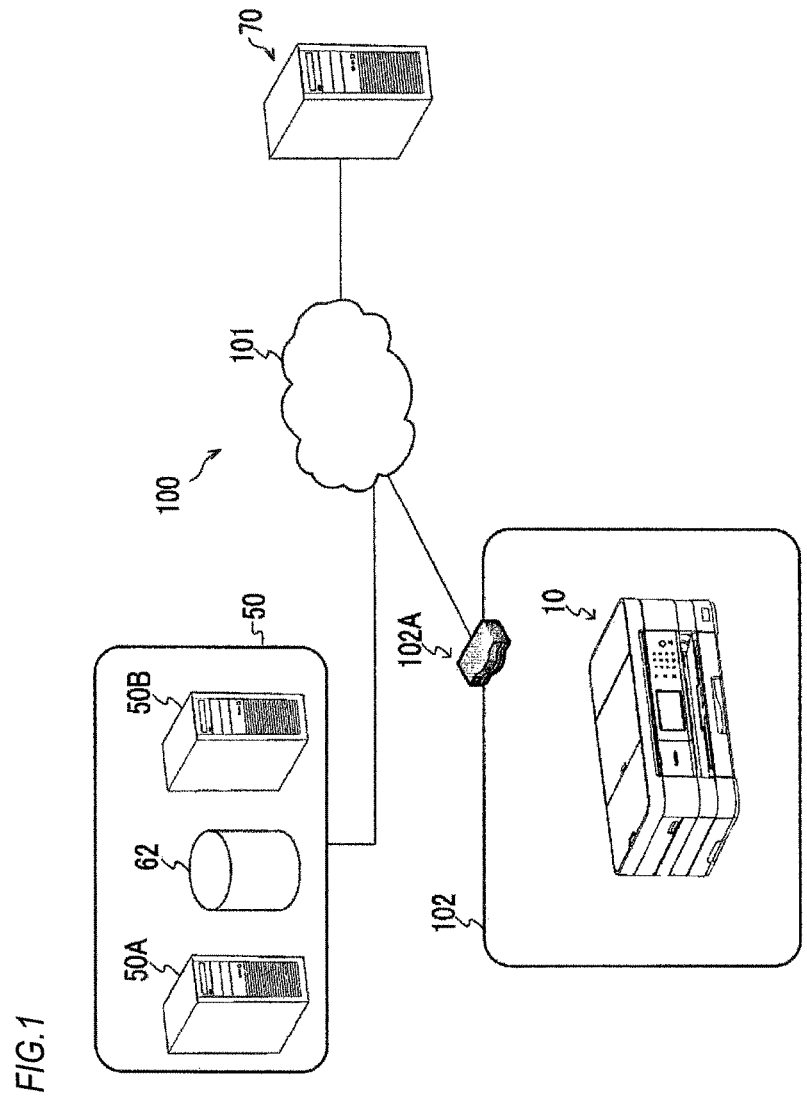
FIG. 1 is a schematic diagram illustrating a communication system 100 according to an embodiment.

FIG. 1 is a schematic diagram illustrating a communication system 100 of the present embodiment. The communication system 100 shown in FIG. 1 is composed of one or more multi-function devices 10 and a relay device 50. The at least one multi-function device 10 and the relay device 50 are connected through a communication network such that they can perform communication with one another. The relay device 50 is configured so as to be able to perform communication with a service providing device 70 through the communication network. Specific examples of the communication network are not particularly limited, and the communication network according to the present embodiment is composed of the Internet 101, and a LAN (an abbreviation for local area network) 102 connected to the Internet 101.

In the example of FIG. 1, the LAN 102 is connected to the Internet 101 through a router 102A or the like. Each multi-function device 10 belongs to the LAN 102, and the relay device 50 and the service providing device 70 are connected to the Internet 101. Further, a device which belongs to the LAN 102 means, for example, a device which has been set up for belonging to the LAN 102 such that it can perform communication with the other devices belonging to the LAN 102, more specifically, a device having a network address assigned for the LAN 102. The router 102A acts as a firewall. That is, the corresponding router 102A passes requests which are transmitted from each multi-function device 10 to the relay device 50, and responses which are transmitted from the relay device 50 to each multi-function device 10. Meanwhile, the corresponding router 102A blocks requests which are transmitted from the relay device 50 to each multi-function device 10.

Multi-Function Device 10

Figure 2A:
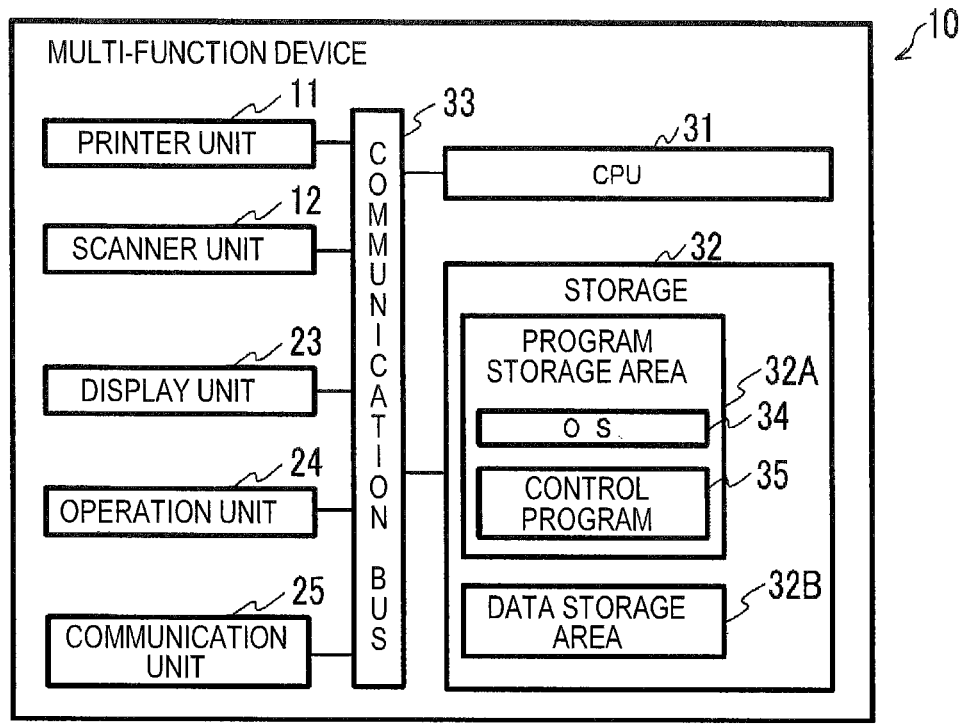
FIG. 2A is a block diagram illustrating a multi-function device 10.

As shown in FIG. 2A, a multi-function device 10 manly includes a printer unit 11, a scanner unit 12, a display unit 23, an operation unit 24, a communication unit 25, a CPU (an abbreviation for central processing unit) 31, a storage 32, and a communication bus 33. These individual components constituting the multi-function device 10 are connected to one another through the communication bus 33. The multi-function device 10 is an example of an image forming device. However, specific examples of the image forming device are not limited to the multi-function device 10, and may be, for example, a printer, a label printer, a scanner, a facsimile, a sewing machine, a 3D printer, a 3D scanner, or the like.

That is, examples of the image forming device include a device for placing consumables such as ink, toner, or thread on planar media based on image data, thereby forming planar images, a device for forming 3D models based on 3D model data, a device for forming image data based on planar images, and a device for forming 3D model data based on 3D models. More specifically, the image forming device may perform a printing process based on image data, thereby forming images on recording sheets. The image forming device may perform a sewing finish process such as embroidery based on image data, thereby forming images on surfaces of fabrics. The image forming device may perform a resin machining process based on 3D model data, thereby forming 3D models. The image forming device may perform a planar-image reading process, thereby generating image data. The image forming device may perform a 3D-model reading process, thereby generating 3D model data. Specific modes of those printing processes, the sewing finish process, the machining process, and those reading processes are not limited.

Printer Unit 11 and Scanner Unit 12

The printer unit 11 performs a recording process of recording images represented by image data on recording sheets. The recording mode of the printer unit 11 is not particularly limited, and can be a publicly known mode such as an inkjet mode or an electrophotographic mode. The scanner unit 12 performs a scanning process of reading images recorded on recording sheets, thereby generating image data. The multi-function device 10 may further perform other processes, such as a FAX process of performing transmission and reception of facsimiles or a copying process of reading images recorded on recording sheets and recording the read images on other recording sheets.

Replacement components which are consumed according to operations can be attached to or detached from the multi-function device 10. Examples of the replacement components include ink cartridges which can be attached to or detached from an inkjet mode printer unit 11, and toner cartridges and drums which can be attached to or detached from an electrophotographic mode printer unit 11. An IC chip mounted on a replacement component contains data items representing, for example, the model number, expiration date, residual amount, and the like of the corresponding replacement component. These data items can be transmitted as collection data (to be described below) to the relay device 50.

Display Unit 23

The display unit 23 has a display screen which displays a variety of information. The specific configuration of the display unit 23 is not particularly limited, and may use, for example, an LCD (an abbreviation for liquid crystal display), an OELD (an abbreviation for organic electro-luminescence display), or the like.

Operation Unit 24

The operation unit 24 receives operations of a user for selecting objects displayed on the display screen of the display unit 23. Specifically, the operation unit 24 has, for example, push buttons, and outputs various operation signals associated with pushed push buttons, to the CPU 31. The operation unit 24 may have a membranous touch sensor superimposed on the display screen of the display unit 23.

That is, the display unit 23 may be configured as a touch panel display. As the touch sensor, a publicly known type such as an electrostatic capacitance type or a resistive film type can be used.

The term "object" means an image which the user can select by operating the operation unit 24. As an example, the objects may be character strings displayed on the display unit 23. In this case, if the user pushes direction keys of the operation unit 24, one of the objects may be highlighted, and then if the user pushes a determination button of the operation unit 24, the highlighted object may be selected. As another example, in a case where the operation unit 24 is a touch panel, the objects may be icons, buttons, links, and the like displayed on the display unit 23, and an object displayed at a touched position may be selected.

Communication Unit 25

The communication unit 25 is an interface for performing communication with external devices through the communication network. The communication unit 25 according to the present embodiment performs communication with external devices by a system based on the IP (an abbreviation for Internet protocol). That is, the multi-function device 10 outputs a variety of information to the relay device 50 through the communication unit 25, and receives a variety of data or a variety of information from the relay device 50 through the communication unit 25.

CPU 31

The CPU 31 controls the operation of the whole multi-function device 10. Based on a variety of information which are output from the operation unit 24, a variety of information acquired from external devices through the communication unit 25, and the like, the CPU 31 acquires various programs (to be described below) from the storage 32, and executes those programs. That is, the CPU 31 and the storage 32 constitute an example of a control device.

Storage 32

The storage 32 has a program storage area 32A and a data storage area 32B. In the program storage area 32A, an OS (an abbreviation for operating system) 34 and a control program 35 are stored. The control program 35 may be a single program, or may be an aggregate of a plurality of programs. In the data storage area 32B, data or information necessary for executing the control program 35 are stored.

In this specification, the term "data" and the term "information" are the same as each other in that they each represent a bit or a bit string which can be handled by a computer. However, when the computer handles "data," it is unnecessary for the computer to recognize the meanings of individual bits. In contrast, when the computer handles "information," an operation of the computer is diverged according to the meanings of individual bits. A term "instruction" represents a control signal for prompting a device which is a transmission destination to perform a subsequent operation. An instruction may include "information" or may have characteristics as "information".

Further, even if "data" or the "information" is changed in format (for example, a text format, a binary format, a flag format, and so on) for each computer, as long as it can be recognized that the meaning of the changed data or information is identical to the meaning of the unchanged data or information, the changed data or information are handled as data or information identical to the unchanged data or information. For example, information indicating "two" may be saved in one computer as an ASCII code "0x32" which is text format information, and may be saved in another computer as a binary number "10" which is binary format information.

In this specification, "data" or "information" subjected to a predetermined operation may be handled as data or information identical to data or information before the predetermined operation. For example, it is assumed a case where un-encoded key information is stored in the storage, and encoded key information is received through the communication unit 25. In this case, if the key information stored in the storage coincides with decoded key information obtained by decoding the encoded key information, all of the key information, the encoded key information, and the decoded key information may be handled as the same "key information". The "predetermined operation" is not limited to encoding, and may be an operation based on a hash function, or the like.

However, the term "data" and the term "information" are not strictly distinguished, and are permitted to be exceptionally handled. For example, data may be temporarily handled as information, or information may be temporarily handled as data. Further, while one is handled as data in one device, the one may be handled as information in another device. Furthermore, information may be taken out from among data, or data may be taken out from among information.

The storage 32 may be configured, for example, by a RAM (an abbreviation for random access memory), a ROM (an abbreviation for read only memory), an EEPROM (an abbreviation for electrically erasable programmable read-only memory), an HDD (an abbreviation for hard disk drive), a buffer which is included in the CPU 31, or a combination of them.

The storage 32 may be a computer-readable storage medium. The computer-readable storage medium is a non-transitory medium. Examples of the non-transitory medium include not only the above described example but also recording media such as a CD-ROM and a DVD-ROM. The non-transitory medium is also a tangible medium. Meanwhile, an electric signal which carries a program which is downloaded from a server or the like on the Internet is a computer-readable signal medium which is one type of computer-readable medium, but is not included in non-transitory computer-readable storage media.

The programs stored in the program storage area 32A are executed by the CPU 31. However, in this specification, sometimes, the operation of each program will be described without mentioning the CPU 31. That is, in the following description, a description meaning that a program "A" performs a process "A" may mean that the CPU 31 performs the process "A" described in the program "A". This is common to the relay device 50 and the service providing device 70 to be described below.

The OS 34 is a basic program which provides an API (an abbreviation for application programming interface) for controlling the printer unit 11, the scanner unit 12, the display unit 23, the operation unit 24, the communication unit 25, and so on which are hardware constituting the multi-function device 10. That is, each of the above described programs controls a corresponding piece of hardware by calling the API which is provided by the OS 34. However, in this specification, the operation of each program will be described without mentioning the OS 34. That is, in the following description, a description meaning that a program "B" controls hardware "C" may means that the program "B" controls the hardware "C" through the API of the OS 34. This is common to the relay device 50 to be described below.

Relay Device 50

Figure 2B:
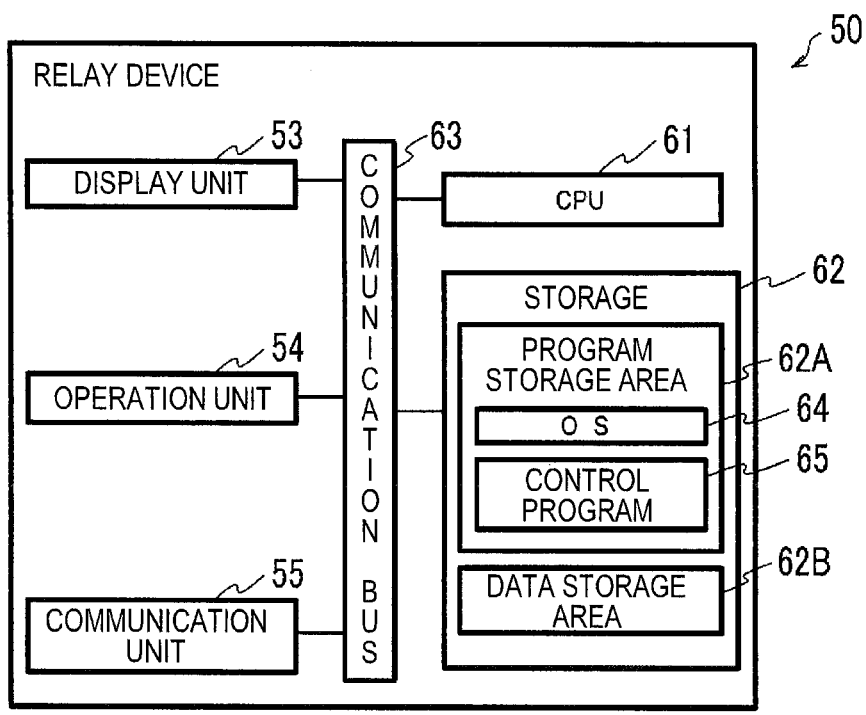
FIG. 2B is a block diagram illustrating a relay device 50.

As shown in FIG. 2B, the relay device 50 mainly includes a display unit 53, an operation unit 54, a communication unit 55, a CPU 61, a storage 62, and a communication bus 63. The display unit 53, the operation unit 54, the communication unit 55, the CPU 61, the storage 62, and the communication bus 63 which are included in the relay device 50 are identical to the display unit 23, the operation unit 24, the communication unit 25, the CPU 31, the storage 32, and the communication bus 33 which are included in the multi-function device 10, and thus repeated descriptions thereof will not be made. The CPU 61 and the storage 62 constitute an example of a control device. The relay device 50 is an example of a server.

A data storage area 62B stores device IDs and permission flags in association with each other, as shown in FIG. 3A. The device IDs are examples of device identification information items for identifying multi-function devices 10. Each of the permission flags is a flag representing whether permission for data collection has been received from a user of a multi-function device 10 which is identified by a corresponding device ID. In each permission flag, any one of "WAITING FOR PERMISSION" representing that a permission procedure has not been performed yet, "PERMISSION OK" representing that declaration of intention to permit has been performed, and "PERMISSION NG" representing that declaration of intention not to permit has been performed is set. Hereinafter, the data storage area 62B storing the information items shown in FIG. 3A will be referred to as the "permission list".

The data storage area 62B stores the device IDs, first identification information items, first collection data items, and first date/time information items, in association with one another, as shown in FIG. 3B. Further, the data storage area 62B stores the device IDs, second identification information items, second collection data items, and second date/time information items, in association with one another, as shown in FIG. 3C. Hereinafter, the data storage area 62B storing the information items shown in FIG. 3B will be referred to as the "first collection data list", and the data storage area 62B storing the information items shown in FIG. 3C will be referred to as the "second collection data list". Furthermore, the data storage area 62B stores a variety of data which should be transmitted to each multi-function device 10.

The first identification information items are data items for identifying the types of first collection data items. That is, in the first collection data list, different first collection data items associated with a common first identification information item may be stored. For example, a first collection data item in a case where a first identification information item represents an ink cartridge model number is a model number read from an IC chip of an ink cartridge actually mounted on a corresponding multi-function device 10. Each of the first date/time information items may be the generation date and time, transmission date and time, or reception date and time of a corresponding first collection data item. This is common to the second identification information items and the second date/time information items.

Service Providing Device 70

The service providing device 70 is a device for providing a service of collecting data from each multi-function device 10 and enabling the corresponding multi-function device 10 to use the corresponding data. Specific examples of the service providing device 70 are not particularly limited, and may be a device for providing a service such as "Dropbox (which is a trademark of DropBox, Inc.)", "Google Drive (Google is a trademark of Google, Inc.), or "Evernote (which is a trademark of Evernote Corporation).

Operation of Communication System 100

Figure 4:
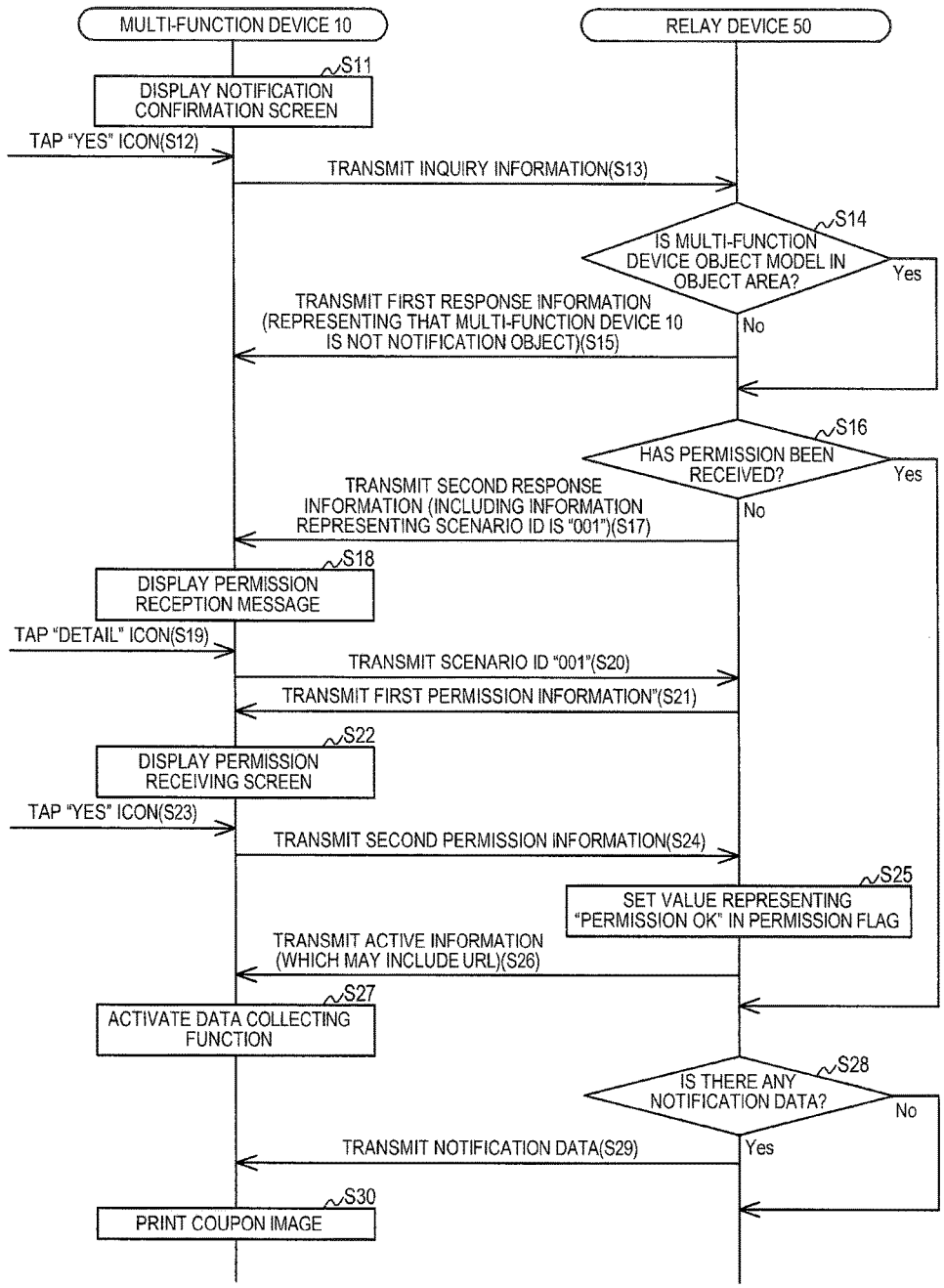
FIG. 4 is a flow chart illustrating a permission receiving process which is performed by the communication system 100.

With reference to FIGS. 4 to 9, an operation of the communication system 100 will be described. First, the communication system according to the present embodiment performs a permission receiving process for receiving permission to transmit data (hereinafter, referred to as collection data) collected by a multi-function device 10 to the relay device 50, from the user of the multi-function device 10, as shown in FIG. 4.

Figure 8A:
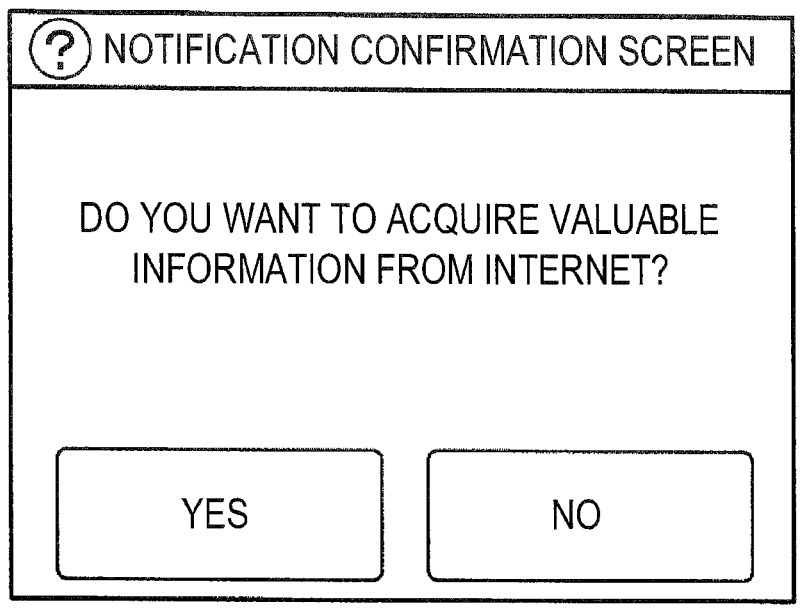
FIGS. 8A and 8B show display examples of a display unit 23. More specifically.

First, in STEP S11, the control program 35 of the multi-function device 10 controls the display unit 23 such that the display unit displays a notification confirmation screen. FIG. 8A shows an example of the notification confirmation screen. The notification confirmation screen shown in FIG. 8A includes a message "DO YOU WANT TO ACQUIRE VALUABLE INFORMATION FROM INTERNET?", a "YES" icon, and a "NO" icon. A timing when the notification confirmation screen is displayed is not particularly limited, and may be, for example, a timing when the multi-function device 10 is first powered up.

Subsequently, if a user's tapping operation on the position of the "YES" icon of the notification confirmation screen is received by the operation unit 24 in STEP S12, in STEP S13, the control program 35 transmits inquiry information to the relay device 50 through the communication unit 25. Thereafter, the inquiry information is regularly transmitted from the multi-function device 10 to the relay device 50. The inquiry information is information related to notification data acquisition. For example, the inquiry information is information for inquiring the relay device 50 about whether there is any notification data. Meanwhile, if a user's tapping operation on the position of the "NO" icon of the notification confirmation screen is received by the operation unit 24, the control program 35 finishes the permission receiving process shown in FIG. 4. Information which is transmitted by the multi-function device 10 includes a device ID for identifying the multi-function device 10. The inquiry information may include model information representing the model of the multi-function device 10.

If a control program 65 of the relay device 50 receives the inquiry information from the multi-function device 10 through the communication unit 55 in STEP S13, in STEP S14, the control program 65 determines whether the multi-function device 10 is a notification data transmission object. For example, if the multi-function device 10 is an object model and has been installed in an object area, in STEP S14, the control program 65 may determine that the corresponding multi-function device 10 is a notification data transmission object.

A case where the multi-function device 10 is an object model is, for example, a case where a model information item on the multi-function device 10 included in the inquiry information coincides with any one of object model information items set in the relay device 50. A case where the multi-function device 10 has been installed in the object area is, for example, a case where the IP address of the transmission source of an IP packet including the inquiry information is included in an object IP address range set in the relay device 50. The object model information items and the object IP address range are set by the administrator of the relay device 50, and are stored in the data storage area 62B. In the IP address of the transmission source of the IP packet including the inquiry information, a global IP address assigned to the router 102A at the timing when the corresponding IP packet passed through the router 102A has been set.

If it is determined that the multi-function device 10 is not a notification data transmission object ("NO" in STEP S14), in STEP S15, the control program 65 transmits first response information representing that the multi-function device 10 is not a notification data transmission object, to the multi-function device 10 through the communication unit 55. Meanwhile, if it is determined that the multi-function device 10 is a notification data transmission object ("YES" in STEP S14), in STEP S16, the control program 65 determines whether it has been permitted to collect data from the multi-function device 10. The process of STEP S16 is an example of a determining process.

For example, in STEP S16, the control program 65 checks a value set in a permission flag registered in the permission list in association with the device ID included in the inquiry information. If the permission flag corresponding to the device ID is "WAITING FOR PERMISSION", the control program 65 determines that data collection has not been permitted yet ("NO" in STEP S16). As another example, if the device ID included in the inquiry information is not contained in the data storage area 62B, the control program 65 determines that data collection has not been permitted ("NO" in STEP S16).

If it is determined that data collection has not been permitted yet ("NO" in STEP S16), in STEP S17, the control program 65 transmits second response information to the multi-function device 10 through the communication unit 55. The second response information is information for enabling the multi-function device to display a notification image, representing that it is possible to display a permission receiving screen (to be described below), on a menu screen. The second response information includes information representing that a scenario ID is 001. The scenario ID is identification information for identifying a series of processes which is performed if the user of the multi-function device 10 confirms the notification image.

Figure 8B:
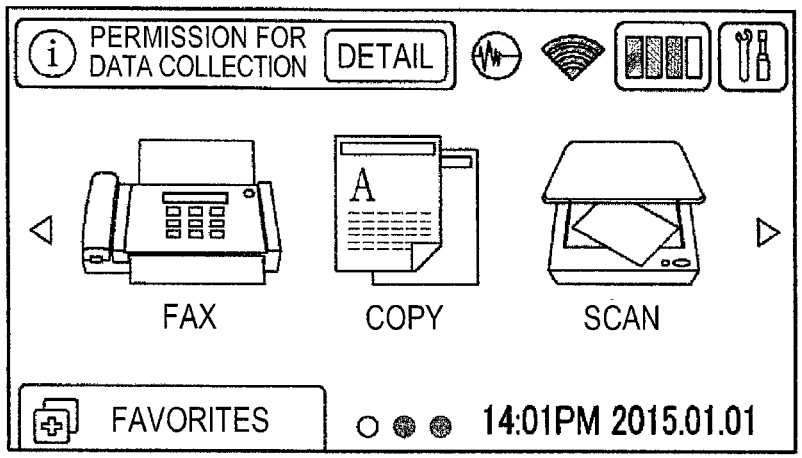

If the control program 35 of the multi-function device 10 receives the second response information from the relay device 50 through the communication unit 25 in STEP S17, in STEP S18, the control program 35 controls the display unit 23 such that the display unit displays the menu screen including the notification image. FIG. 8B shows an example of the menu screen. The menu screen shown in FIG. 8B includes a notification image display area, a "DETAIL" icon, a "FAX" icon, a "COPY" icon, and a "SCAN" icon. The notification image display area is an area where the notification image represented by the second response information is displayed. In the notification image display area which is displayed in STEP S18, a text "PERMISSION FOR DATA COLLECTION" is displayed.

If a user's tapping operation on the position of the "FAX" icon, the "COPY" icon, or the "SCAN" icon is received by the operation unit 24, the control program 35 performs a FAX process, a copying process, or a scanning process associated with the tapped icon. Meanwhile, if a user's tapping operation on the position of the "DETAIL" icon is received by the operation unit 24 in STEP S19, in STEP S20, the control program 35 transmits the scenario ID to the relay device 50 through the communication unit 25. The scenario ID which is transmitted in STEP S20 is the scenario ID "001" included in the second response information.

If the control program 65 of the relay device 50 receives the scenario ID "001" from the multi-function device 10 through the communication unit 55 in STEP S20, in STEP S21, the control program 65 transmits first permission information to the multi-function device 10 through the communication unit 55. The first permission information is information for confirming whether the user of the multi-function device 10 permits data collection. The first permission information according to the present embodiment is information which defines a permission receiving screen for prompting the user of the multi-function device 10 to permit data collection. The first permission information defines the permission reception screen, for example, by HTML (an abbreviation for HyperText Markup Language), XML (an abbreviation for Extensible Markup Language), or the like. The process of STEP S21 is an example of a first transmitting process.

Figure 9A:
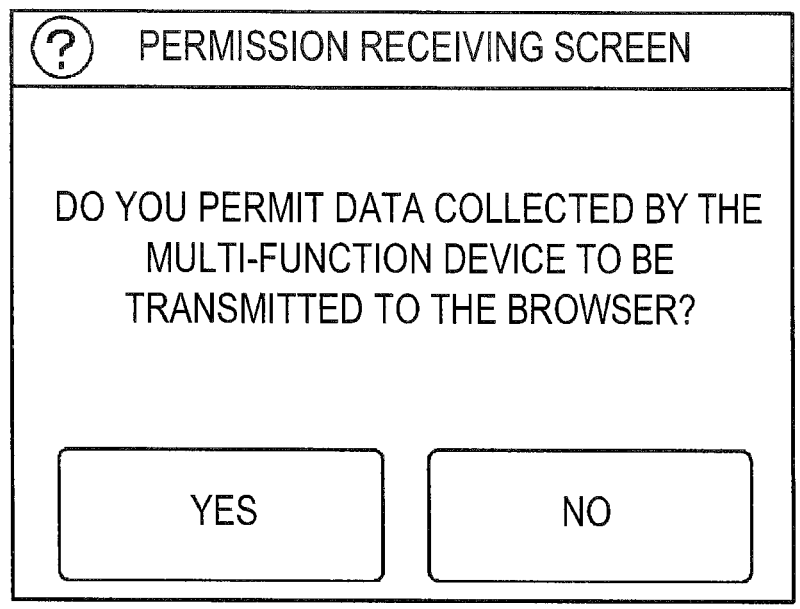
FIGS. 9A and 9B show other display examples of a display unit 23. More specifically.

If the control program 35 of the multi-function device 10 receives the first permission information from the relay device 50 through the communication unit 25 in STEP S21, in STEP S22, the control program 35 controls the display unit 23 such that the display unit displays the permission receiving screen. FIG. 9A shows an example of the permission receiving screen. The permission receiving screen shown in FIG. 9A includes a message "DO YOU PERMIT DATA COLLECTED BY THE MULTI-FUNCTION DEVICE TO BE TRANSMITTED TO THE BROWSER?", a "YES" icon, and a "NO" icon. The process of STEP S22 is an example of a display control process.

If a user's tapping operation on the position of the "YES" icon of the permission receiving screen is received by the operation unit 24 in STEP S23, in STEP S24, the control program 35 transmits second permission information to the relay device 50 through the communication unit 25. The second permission information is information representing that data collection has been permitted. The process of STEP S24 is an example of a permission confirming process. Meanwhile, if a user's tapping operation on the position of the "NO" icon of the permission receiving screen is received by the operation unit 24, the control program 35 transmits third permission information to the relay device 50 through the communication unit 25, and finishes the permission receiving process shown in FIG. 4. The third permission information is information representing that data collection has not been permitted.

If the control program 65 of the relay device 50 receives the second permission information from the multi-function device 10 through the communication unit 55 in STEP S24, in STEP S25, the control program 65 sets a value representing "PERMISSION OK" in the permission flag corresponding to the device ID included in the second permission information. Information representing "PERMISSION OK" which is set in the permission flag may be included in the second permission information. That is, in the permission list, the device ID and the second permission information may be registered in association with each other. Meanwhile, if the control program 65 receives the third permission information from the multi-function device 10 through the communication unit 55, in STEP S24, the control program 65 sets a value representing "PERMISSION NG", in the permission flag corresponding to the device ID included in the third permission information. In this case, the control program 65 finishes the permission receiving process shown in FIG. 4, without performing the processes of STEP S26 and its subsequent steps.

Subsequently, in STEP S26, the control program 65 transmits active information to the multi-function device 10 through the communication unit 55. The active information is information for activating a data collecting function of the multi-function device 10. The active information may include a URL (an abbreviation for uniform resource locator) representing the location of a second device 50B which is the transmission source of request information (to be described below). The URL is an example of location information. The processes of STEPS S25 and S26 are an example of a second transmitting process. In a case where the URL representing the location of the second device 50B has been stored in advance in the multi-function device 10, the corresponding URL may not be included in the active information.

If the control program 35 of the multi-function device 10 receives the active information from the relay device 50 through the communication unit 25 in STEP S26, the control program 35 activates the data collecting function. The data collecting function means, for example, all functions necessary for transmitting collection data collected from the multi-function device 10 to the relay device 50. Examples of the data collecting function include a function of performing advance preparation for enabling the relay device 50 to receive collection data, a function of collecting data from the multi-function device 10, a function of collecting the corresponding data in the relay device 50, and the like.

Meanwhile, in STEP S16, if the permission flag corresponding to the device ID is "PERMISSION OK", the control program 65 of the relay device 50 determines whether data collection has been already permitted ("YES" in STEP S16). If the control program 65 determines that data collection has been already permitted ("YES" in STEP S16), in STEP S28, the control program 65 determines whether any notification data which should be transmitted to the multi-function device 10 has been stored in the data storage area 62B. A method of storing notification data in the data storage area 62B will be described below with reference to FIG. 7. Meanwhile, if it is determined in STEP S16 that the permission flag corresponding to the device ID is "PERMISSION NG", the control program 65 finishes the permission receiving process shown in FIG. 4, without performing the processes of STEP S17, and STEP S28 and its subsequent steps.

If the control program 65 determines that notification data has been stored in the data storage area 62B ("YES" in STEP S28), in STEP S29, the control program 65 transmits the notification data acquired from the data storage area 62B, to the multi-function device 10 through the communication unit 55. The notification data according to the present embodiment is data for prompting the user of the multi-function device 10 to purchase a new replacement component. More specifically, the notification data includes a coupon number for identifying a discount coupon for discounting the purchase price of the replacement component, and a coupon image representing the corresponding discount coupon.

Figure 9B:
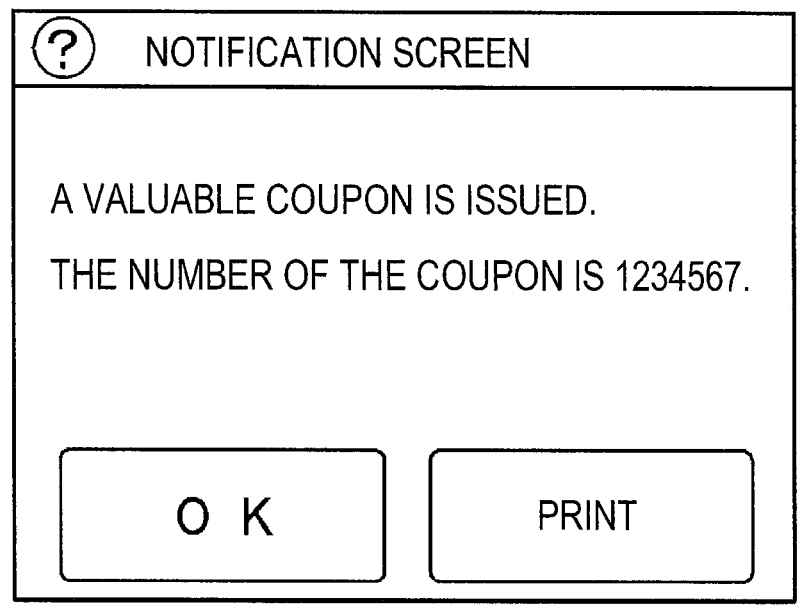

If the control program 35 of the multi-function device 10 receives the notification data from the relay device 50 through the communication unit 25 in STEP S29, in STEP S30, the control program 35 controls the display unit 23 such that the display unit displays a notification screen. FIG. 9B shows an example of the notification screen. The notification screen shown in FIG. 9B includes a message "A VALUABLE COUPON IS ISSUED. THE NUMBER OF THE COUPON IS 1234567.", an "OK" icon, and a "PRINT" icon.

If a user's tapping operation on the position of the "OK" icon of the notification screen is received by the operation unit 24, the control program 35 finishes display of the notification screen. Meanwhile, if a user's tapping operation on the position of the "PRINT" icon of the notification screen is received by the operation unit 24, the control program 35 controls the printer unit 11 such that the printer unit records the coupon image on a recording sheet. This process is an example of a recording process. Alternatively, if the control program 35 receives the notification data from the relay device 50 through the communication unit 25, it may perform the recording process, without displaying the notification screen.

Figure 5:
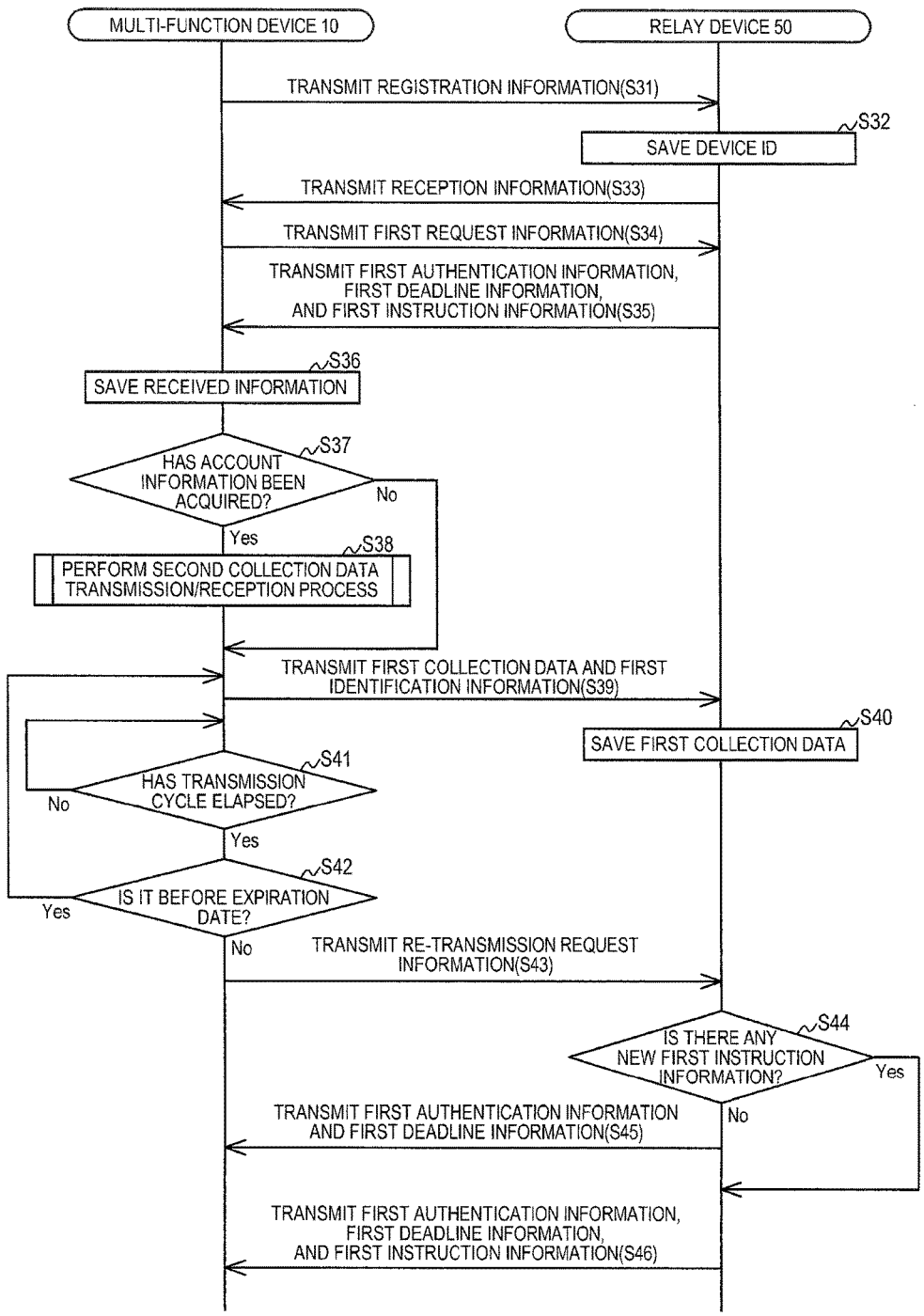
FIG. 5 is a flow chart illustrating a first collection data transmission/reception process which is performed by the communication system 100.

The communication system 100 including a multi-function device 10 whose data collecting function is active performs a first collection data transmission/reception process as shown in FIG. 5. First, in STEP S31, the control program 35 transmits registration information to the relay device 50 through the communication unit 25. The registration information is information for notifying the relay device 50 that the multi-function device 10 is a data collection object. The registration information includes the device ID of the multi-function device 10.

If the control program 65 of the relay device 50 receives the registration information from the multi-function device 10 through the communication unit 55 in STEP S31, in STEP S32, the control program 65 stores the device ID included in the registration information, in the data storage area 62B. The control program 65 transmits reception information to the multi-function device 10 through the communication unit 55 in STEP S33. The reception information is information for notifying the multi-function device 10 that the device ID has been registered.

If the control program 35 of the multi-function device 10 receives the reception information from the relay device 50 through the communication unit 25 in STEP S33, in STEP S34, the control program 35 transmits first request information to the relay device 50 through the communication unit 25. The first request information is information for requesting the relay device 50 to transmit information necessary for collecting and transmitting first collection data. The first request information may include the registration information. That is, STEPS S31 and S34 may be independently performed, or may be performed at the same time. The processes of STEPS S31 and S34 are an example of a first requesting process.

If the control program 65 of the relay device 50 receives the first request information from the multi-function device 10 through the communication unit 55 in STEP S34, in STEP S35, the control program 65 transmits first authentication information, first deadline information, and first instruction information stored in the data storage area 62B, to the multi-function device 10 through the communication unit 55. The first authentication information is information necessary for enabling the multi-function device 10 to receive collection data. The first authentication information is, for example, a token. The first deadline information is information representing the expiration date of the first authentication information. The first instruction information is information for instructing the multi-function device 10 to transmit data which should be collected. The first instruction information includes first identification information for identifying first collection data, and first cycle information representing the transmission cycle of the first collection data. A method by which the relay device 50 acquires the first instruction information will be described below with reference to FIG. 7. The processes of STEPS S32 and S35 are an example of a third transmitting process or a first instructing process.

If the control program 35 of the multi-function device 10 receives the first authentication information, the first deadline information, and the first instruction information from the relay device 50 through the communication unit 25 in STEP S35, in STEP S36, the control program 35 stores the received various information in the data storage area 32B.

The process of STEP S35 is an example of a first receiving process. Subsequently, in STEP S37, the control program 35 determines whether account information has been acquired.

The account information is, for example, information assigned for the service providing device 70 in advance by the relay device 50 and distributed to the user of the multi-function device 10. The account information may be, for example, a PIN (an abbreviation for personal identification number), or may be a combination of user identification information and a password. A method of acquiring the account information is not particularly limited. For example, the control program 35 may acquire the account information from the user through the operation unit 24, or may be acquire the account information from a first device 50A or the like from the communication unit 25.

If it is determined that the account information has not been received yet ("NO" in STEP S37), in STEP S39, the control program 35 collects the first collection data identified by the first identification information, and transmits the first collection data and the first identification information to the relay device 50 through the communication unit 25, by using the first authentication information. The process of STEP S39 is an example of a first collecting process. The transmission of the first collection data and the first identification information by using the first authentication information may mean, for example, transmission of the first collection data and the first identification information encoded by the first authentication information.

If the control program 65 of the relay device 50 receives the first collection data and the first identification information transmitted from the multi-function device 10 by using the first authentication information, through the communication unit 55 in STEP S39, in STEP S40, the control program 65 registers the first collection data and the first authentication information in the first collection data list, in association with the device ID of the multi-function device 10. The process of STEP S40 is an example of a storing control process.

After the first collecting process starts, in STEP S41, the control program 35 of the multi-function device 10 monitors whether the transmission cycle represented by the first cycle information has elapsed. If the transmission cycle has elapsed ("YES" in STEP S41), in STEP S42, the control program 35 determines whether the expiration date represented by the first deadline information has come. If the expiration date of the first authentication information has not come yet ("YES" in STEP S42), in STEP S39, the control program 35 performs the first collecting process again. That is, the control program 35 performs the first collecting process whenever the transmission cycle elapses, until the expiration date of the first authentication information comes.

Meanwhile, if the transmission cycle has elapsed, and the expiration date has already come ("YES" in STEP S41, and "NO" in STEP S42), in STEP S43, the control program 35 transmits re-transmission request information to the relay device 50 through the communication unit 25. The re-transmission request information is information for requesting the relay device 50 to transmit new first authentication information and new first deadline information. The process of STEP S43 is an example of a re-transmission requesting process.

If the control program 65 of the relay device 50 receives the re-transmission request information from the multi-function device 10 through the communication unit 55 in STEP S43, in STEP S44, the control program 65 determines whether any new first instruction information has been stored in the data storage area 62B. If any new first instruction information has not been stored in the data storage area 62B ("NO" in STEP S44), in STEP S45, the control program 65 transmits new first authentication information and new first deadline information to the multi-function device 10 through the communication unit 55.

Meanwhile, if new first instruction information has been stored in the data storage area 62B ("YES" in STEP S44), in STEP S46, the control program 65 transmits new first authentication information, new first deadline information, and new first instruction information to the multi-function device 10 through the communication unit 55. The new first authentication information and the new first deadline information are generated, for example, by the relay device 50. A method by which the relay device 50 acquires the new first instruction information will be described below with reference to FIG. 7. The process of STEP S46 is an example of a first updating process.

If the control program 35 of the multi-function device 10 acquires the new first authentication information and the new first deadline information from the relay device 50 through the communication unit 25 in STEP S45, the control program 35 overwrites the first authentication information and the first deadline information already stored in the data storage area 32B, with the new first authentication information and the first deadline information. Subsequently, in STEP S39, the control program 35 performs the first collecting process using the corresponding new first authentication information.

Meanwhile, if the control program 35 receives the new first authentication information, the new first deadline information, and the new first instruction information from the relay device 50 through the communication unit 25 in STEP S46, it overwrites the first authentication information, the first deadline information, and the first instruction information already stored in the data storage area 32B, with the new first authentication information, the new first deadline information, and the new first instruction information. Subsequently, in STEP S39, the control program 35 performs the first collecting process using the corresponding new first authentication information. In the first collecting process which is performed at this moment, the control program 35 transmits first collection data identified by the old first identification information and first collection data identified by the new first identification information, to the relay device 50.

Figure 6:
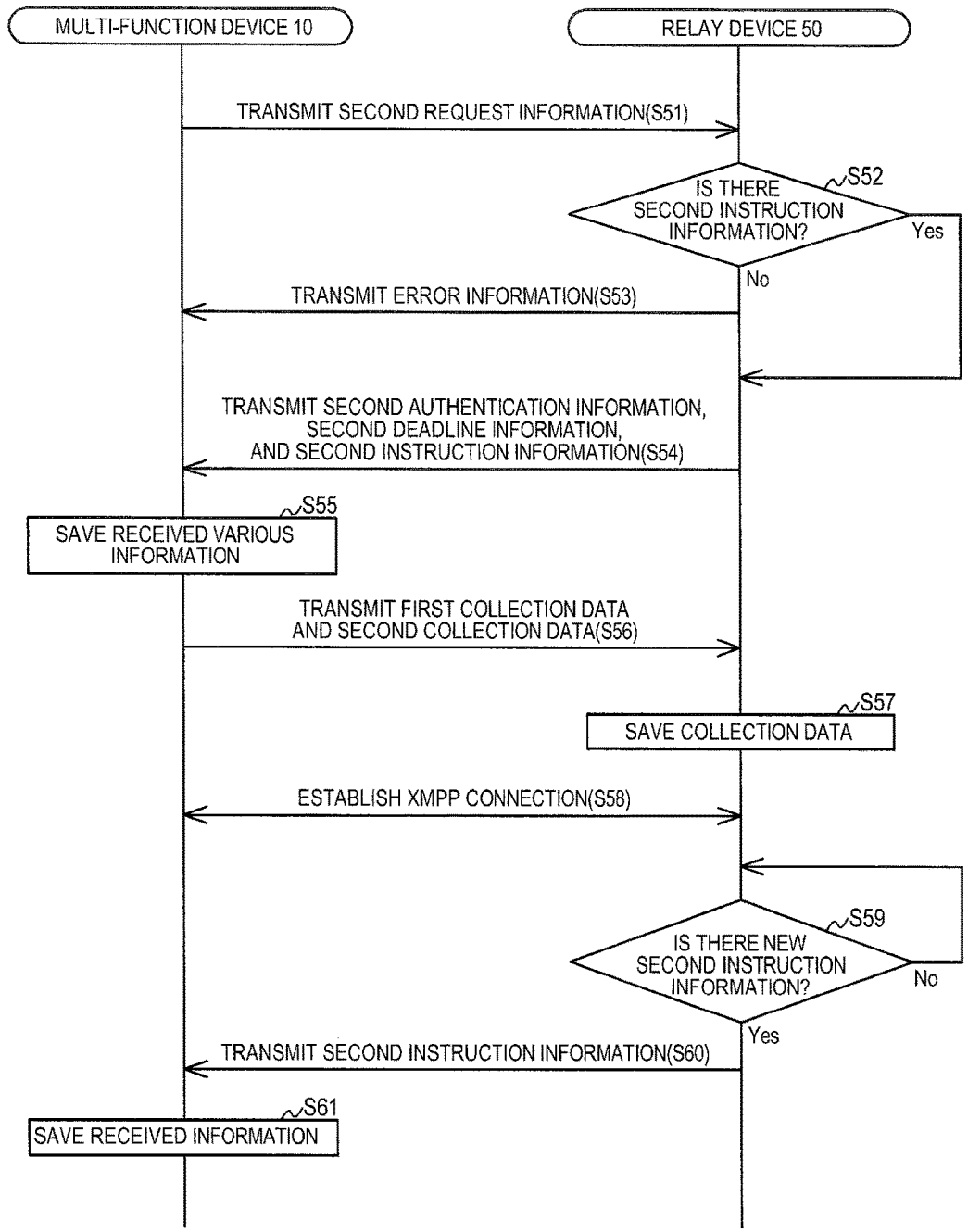
FIG. 6 is a flow chart illustrating a second collection data transmission/reception process which is performed by the communication system 100.

The communication system 100 repeatedly performs the processes of STEPS S37 to S46 until the multi-function device 10 acquires the account information. Meanwhile, if the control program 35 performs the first requesting process (STEPS S31 and S34), and acquires the account information ("YES" in STEP S37), in STEP S38, the control program 35 performs a second collection data transmission/reception process as shown in FIG. 6. In other words, after the multi-function device 10 acquires the account information, the processes of STEPS S37 to S46 are not performed.

First, in STEP S51, the control program 35 transmits second request information to the relay device 50 through the communication unit 25. The second request information is information for requesting the relay device 50 to transmit information necessary for collecting and transmitting second collection data. The second request information includes the account information. The process of STEP S51 is an example of a second requesting process.

If the control program 65 of the relay device 50 receives the second request information from the multi-function device 10 through the communication unit 55 in STEP S51, in STEP S52, the control program 65 determines whether any second instruction information corresponding to the account information has been stored in the data storage area 62B. A method of storing second instruction information in the data storage area 62B will be described below with reference to FIG. 7. If any second instruction information corresponding to the account information has not been stored in the data storage area 62B ("NO" in STEP S52), in STEP S53, the control program 65 transmits error information to the multi-function device 10 through the communication unit 55. The error information is information for notifying the multi-function device 10 that there is no second instruction information which should be transmitted.

Meanwhile, if second instruction information corresponding to the account information has been stored in the data storage area 62B ("YES" in STEP S52), in STEP S54, the control program 65 transmits second authentication information, second deadline information, and the second instruction information stored in the data storage area 62B, to the multi-function device 10 through the communication unit 55. The second authentication information, the second deadline information, and the second instruction information are similar to the first authentication information, the first deadline information, and the first instruction information as described above. However, an expiration date represented by the second deadline information is later than the expiration date represented by the first deadline information. The second instruction information includes the first identification information, and second identification information different from the first identification information. The process of STEP S54 is an example of the third transmitting process or a second instructing process.

If the control program 35 of the multi-function device 10 receives the second authentication information, the second deadline information, and the second instruction information from the relay device 50 through the communication unit 25 in STEP S54, in STEP S55, the control program 35 stores the received various information in the data storage area 32B. The process of STEP S54 is an example of a second receiving process. Subsequently, in STEP S56, the control program 35 collects the first collection data identified by the first identification information, and the second collection data identified by the second identification information, and transmits the first collection data, the second collection data, the first identification information, and the second identification information to the relay device 50 through the communication unit 25, by using the second authentication information. The process of STEP S56 is an example of a second collecting process.

If the control program 65 of the relay device 50 receives the first collection data, the second collection data, the first identification information, and the second identification information transmitted from the multi-function device 10 by using the second authentication information, through the communication unit 55 in STEP S56, in STEP S57, the control program 65 registers the first identification information and the first collection data in association with the device ID in the first collection data list, and registers the second identification information and the second collection data in association with the device ID in the second collection data list. Thereafter, whenever a transmission cycle represented by second cycle information elapses, second collection data is transmitted between the multi-function device 10 and the relay device 50.

In response to performance of the second receiving process, in STEP S58, the control program 35 of the multi-function device 10 establishes a connection (hereinafter, referred to as an "XMPP connection") with the relay device 50. The process of STEP S58 is an example of a connection establishing process. The connection establishing process is performed by a procedure based on XMPP over BOSH (an abbreviation for Extensible Messaging and Presence Protocol Over Bidirectional-Streams Over Synchronous HTTP). An XMPP server may mediate between the multi-function device 10 and the relay device 50.

XMPP over BOSH is a protocol for almost always maintaining a state where the connection has been established. However, a protocol for establishing a connection between the multi-function device 10 and the relay device 50 is not limited to XMPP over BOSH, and may be, for example, a protocol called a connection establishment type protocol, a full-time connection type protocol, or a connection maintenance type protocol.

The XMPP connection is a connection for transmitting requests from the relay device 50 to the multi-function device 10 through the router 102A (this transmission means so-called "server push"). Also, the XMPP connection is cut off if a predetermined connection maintenance period elapses. In this case, for example, if a re-connection interval shorter than the connection maintenance period elapses, the control program 35 establishes a XMPP connection with the relay device 50. The XMPP connection is maintained by the multi-function device 10, for example, while the second collection data transmission/reception process is performed.

Meanwhile, in STEP S59, the control program 65 of the relay device 50 monitors acquisition of new second instruction information. If the control program 65 acquires new second instruction information from the service providing device 70 ("YES" in STEP S59), in STEP S60, the control program 65 transmits the corresponding second instruction information to the multi-function device 10 through the XMPP connection. A method by which the relay device 50 acquires new second instruction information will be described below with reference to FIG. 7. The process of STEP S60 is an example of a second updating process.

If the control program 35 of the multi-function device 10 receives the new second instruction information from the relay device 50 through the communication unit 25 in STEP S60, in STEP S61, the control program 35 overwrites the second instruction information already stored in the data storage area 32B, with the new second instruction information. Subsequently, in STEP S56, the control program 35 performs the second collecting process according to the new second instruction information. The processes of STEPS S56 to S61 are repeatedly performed while the second collection data transmission/reception process is performed.

Figure 7:
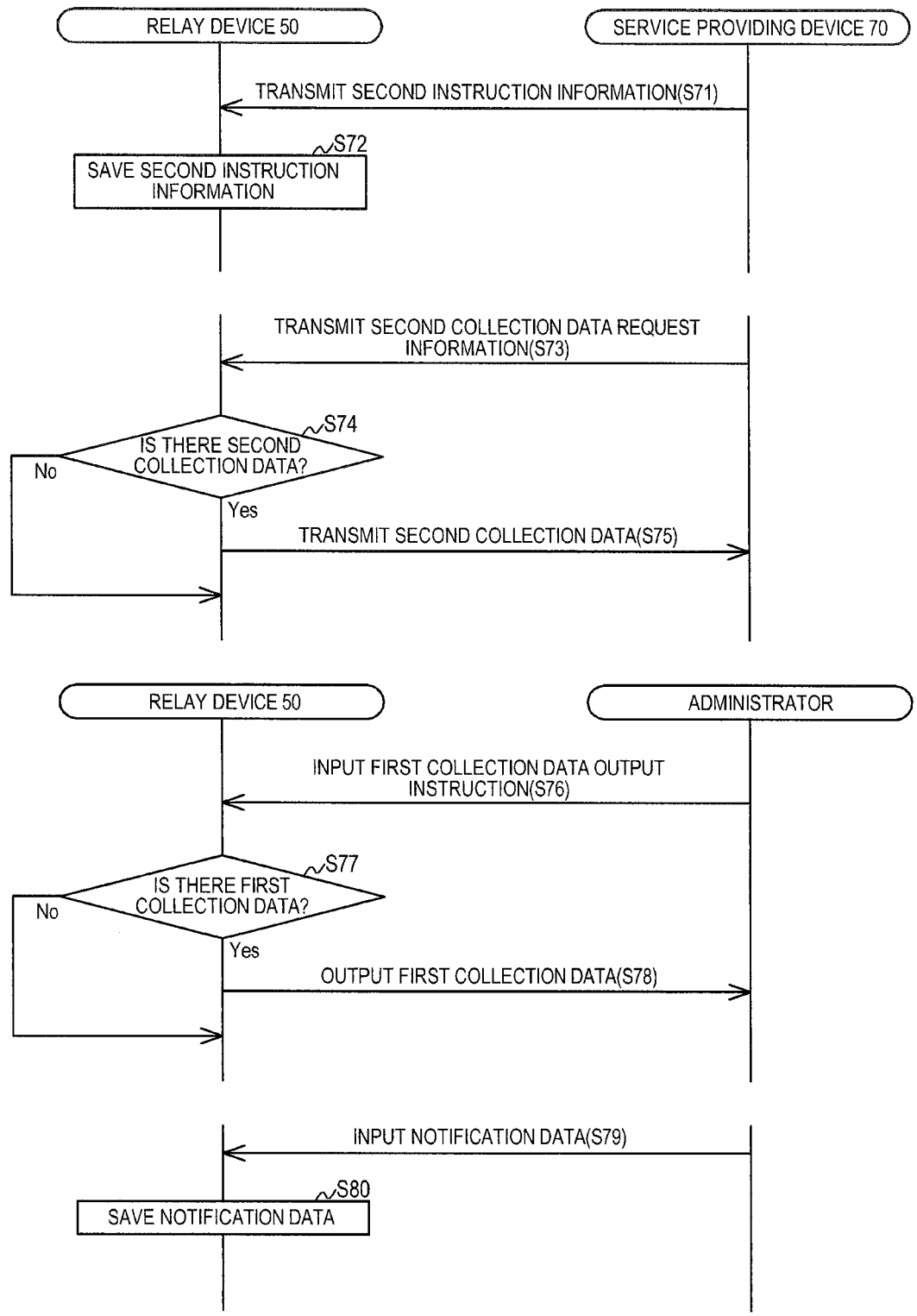
FIG. 7 is a flow chart illustrating a data input/output process of the relay device 50 with a service providing device 70 or an administrator.

The communication system 100 according to the present embodiment performs a process shown in FIG. 7, in parallel to the above described processes shown in FIGS. 4 to 6. That is, the processes shown in FIGS. 4 to 6 and the process shown in FIG. 7 are asynchronously performed.

First, if the control program 65 of the relay device 50 receives second instruction information and account information from the service providing device 70 through the communication unit 55 in STEP S71, in STEP S72, the control program 65 stores the second instruction information and the account information in association with each other in the data storage area 62B. The second instruction information stored at that moment is transmitted to the multi-function device 10 in the second updating process of STEP S60. In the second instruction information received from the service providing device 70, any first identification information is not included. That is, in STEP S60, the control program 65 includes first identification information in the second instruction information acquired from the service providing device 70, and transmits the second instruction information to the multi-function device 10. Although not shown, if the control program 65 acquires first instruction information from the administrator of the relay device 50 through the operation unit 54 or the communication unit 55, it stores the corresponding first instruction information in the data storage area 62B.

If the control program 65 receives second collection data request information from the service providing device 70 through the communication unit 55 in STEP S73, in STEP S74, the control program 65 determines whether any second collection data which should be transmitted to the corresponding service providing device 70 has been registered in the second collection data list. If second collection data has been registered in the second collection data list ("YES" in STEP S74), in STEP S75, the control program 65 transmits the second collection data registered in the second collection data list, together with a device ID, second identification information, and second date/time information corresponding to the second collection data, to the service providing device 70 through the communication unit 55. The series of the processes of STEPS S56, S57, and S75 is an example of a relaying process.

If the control program 65 acquires a first collection data output instruction from the administrator of the relay device 50 through the operation unit 54 or the communication unit 55 in STEP S76, in STEP S77, the control program 65 determines whether any first collection data which should be output has been registered in the first collection data list. If first collection data has been registration information the first collection data list ("YES" in STEP S77), in STEP S78, the control program 65 outputs the first collection data registered in the first collection data list, together with a device ID, first identification information, and first date/time information corresponding to the first collection data. A method of outputting the first collection data is not particularly limited. For example, the first collection data may be displayed on the display unit 53, or may be transmitted to a terminal of the administrator through the communication unit 55, or may be printed by a printer connected to the relay device 50. The process of STEP S78 is an example of an outputting process.

Based on the information output in STEP S78, the administrator of the relay device 50 can examine what notification data should be transmitted to the multi-function device 10, or the like. For example, by analyzing a value change in first collection data collected at a plurality of timings, the corresponding administrator may decide to issue a coupon for a replacement component associated with the corresponding first collection data, to the user of the multi-function apparatus 10. This process is not necessarily performed by the administrator, and may be performed by the relay device 50 or another device.

Further, if the control program 65 acquires notification data from the administrator of the relay device 50 through the operation unit 54 or the communication unit 55 in STEP S79, in STEP S80, the control program 65 stores the corresponding notification data in the data storage area 62B. The notification data stored at that moment is transmitted to the multi-function device 10 in STEP S29. The notification data which is input to the relay device 50 in STEP S79 is generated based on the first collection data output in STEP S78. The processes of STEPS S79 and S80 are an example of an acquiring process.

Effects of Present Embodiment

According to the above described embodiment, between the multi-function device 10 which is a data collection source and the relay device 50, the procedure of permitting data collection is performed. As a result, it is possible to simplify an authenticating procedure as compared to a case of performing an authenticating procedure through another device such as a PC. According to the above described embodiment, the permitting procedure starts at a timing when an inquiry about transmission of notification data is made. That is, at a timing when the user desires to acquire notification data, the permitting procedure is performed. According to the above described embodiment, it is possible to manage information representing that data collection has been permitted in the multi-function device 10, in the permission list of the relay device 50. However, information on whether data collection has been permitted is not necessarily managed in the relay device 50, and may be managed in the multi-function device 10.

According to the above described embodiment, if permission for data collection is received from the user, first collection data is transmitted to the relay device 50, and if account information is acquired, second collection data is transmitted to the relay device 50. Then, the relay device 50 stores the first collection data collected from the multi-function device 10 which is the transmission source of the first request information, in the data storage area 62B, and relays the second collection data collected from the multi-function device 10 which is the transmission source of the second request information, to the service providing device 70. As a result, it is possible to switch the types of collection data according to the procedure of permitting data collection. Therefore, it is possible to output first collection data which the relay device 50 needs, to the administrator, and relay second collection data which the service providing device 70 needs, to the service providing device 70.

According to the above described embodiment, notification data is generated based on first collection data, and the notification data is transmitted to the multi-function device 10 at an inquiry information transmitting timing. As a result, it is possible to enable the user of the multi-function device 10 to acquire a coupon. The user may input a coupon number displayed on a notification screen, to a WEB site for purchasing a corresponding replacement component, or may be read QR code (which is a trademark) or the like included in a coupon image printed on a sheet, thereby accessing a WEB site for purchasing a corresponding replacement component.

The replacement components of the present embodiment are not limited to replacement components which are consumed according to an operation of a multi-function device 10. That is, the replacement components need only to be necessary for an operation of a multi-function device 10 and be attachable to and detachable from a multi-function device 10. Examples of the replacement components include a tray for supporting recording sheets, a memory card for storing image data of a fixed format, and so on. Further, in this case, the relay device 50 may transmit notification data for prompting a user to purchase a tray having a capacity larger than a tray mounted on a multi-function device 10, to the multi-function device 10, or may transmit notification data for prompting a user to purchase a memory card, to a multi-function device 10 having no memory card.

According to the above described embodiment, in the first collection data transmission/reception process, whenever the transmission cycle represented by the first cycle information elapses, the first collection data is transmitted from the multi-function device 10 to the relay device 50. In the second collection data transmission/reception process, whenever the transmission cycle represented by the second cycle information elapses, the first collection data and the second collection data are transmitted from the multi-function device 10 to the relay device 50. However, the processes of STEPS S39 to S46 and the processes of STEPS S56 to S61 may be performed in parallel. As a result, the first collection data can be transmitted according to the first cycle information, and the second collection data can be transmitted according to the second cycle information.

According to the above described embodiment, the first instruction information is updated by the first updating process, and the second instruction information is updated by the second updating process. As a result, it is possible to acquire desired collection data from the multi-function device 10. As a result, it is possible to generate appropriate notification data based on the first collection data. It is possible to relay second collection data which the service providing device 70 desires. Further, since the first updating process is performed at the timing when the expiration date of the first authentication information comes, it is possible to implement the first updating process without significantly changing an existing process. Furthermore, since the second updating process is performed by using the XMPP connection, it is possible to immediately reflect a change of the second instruction information.

In the above described embodiment, the variety of information which are transmitted from the multi-function device 10 are transmitted as HTTP (an abbreviation for HyperText Transfer Protocol) requests to the relay device 50. Meanwhile, the variety of information which are transmitted from the relay device 50 are transmitted as HTTP responses to the multi-function device 10. However, the new second instruction information which is transmitted in STEP S60 is transmitted to the multi-function device 10 through the XMPP connection.

The first permission information of STEP S21 is transmitted as a response to the inquiry information of STEP S13. That is, the processes of STEP S15, and S17 to S20 can be omitted. As described above, while a pair of request information and response information is transmitted and received between the multi-function device 10 and the relay device 50, another process may be performed. The first authentication information, the first deadline information, and the first instruction information of STEP S35 are transmitted as a response to the first request information of STEPS S31 and S34. Like this, one of one pair of information items which are transmitted and received between the multi-function device 10 and the relay device 50 may be composed of a plurality of partitions.

Similarly, the active information of STEP S26 is transmitted as a response to the second permission information of STEP S24. The notification data of STEP S29 is transmitted as a response to the inquiry information of STEP S13. The variety of information of STEPS S45 and S46 are transmitted as a response to the re-transmission request information of STEP S43. The variety of information of STEPS S53 and S54 are transmitted as a response to the second request information of STEP S51.

The relay device 50 of the present embodiment may be configured by the first device 50A, the second device 50B, and a storage 62 as shown in FIG. 1. The first device 50A and the second device 50B may be able to access to the storage 62 through the communication network. In this case, the permission receiving process is performed by the first device 50A. The first collection data transmission/reception process shown in FIG. 5 and the second collection data transmission/reception process shown in FIG. 6 are performed by the second device 50B. Further, in the processes shown in FIG. 7, the processes of STEPS S71 to S78 are performed by the second device 50B, and the processes of STEPS S79 and S80 are performed by the first device 50A.

The relay device 50 of the present embodiment may be configured by one first device 50A and a plurality of second devices 50B. For each of the plurality of second devices 50B, an area of responsibility for data collection may be assigned. That is, each second device 50B receives collection data from each multi-function device 10 installed in a corresponding area of responsibility. In this case, in STEP S26, the first device 50A may include the URL of a second device 50B being in charge of the installation location of the multi-function device 10 which is the transmission source of the account information, in the account information.

An example in which in a multi-function device 10 or the relay device 50 of the above described embodiment, the various programs stored in the program storage area 32A or 62A of the storage 32 or 62 are executed by the CPU 31 or 61, whereby each process of the control device of the aspect of the present disclosure is implemented has been described. However, the configuration of the control device is limited thereto, and the whole or a part of the control device may be implemented by hardware such as an IC (abbreviation for Integrated Circuit) and the like.

Further, the aspect of the present disclosure can be implemented as the multi-function device 10 or the relay device 50, and can also be implemented as a program making the multi-function device 10 or the relay device 50 perform the processes. Furthermore, the corresponding program may be recorded in a non-transitory recording medium to be provided. The non-transitory recording medium may include a storage mounted on a server which can be connected to the multi-function device 10 or the relay device 50 through the communication network, besides a CD-ROM, a DVD-ROM, or the like. Further, the program stored in the storage of the server may be distributed as information or a signal representing the corresponding program, through the communication network such as the Internet.

What is claimed is:

1. A server comprising:
   a communication interface configured to perform communication with an image forming device through the Internet, the image forming device belonging to a LAN which is connected to the Internet through a router, the router configured to pass requests transmitted from the image forming device to the server, the router configured to pass responses transmitted from the server to the image forming device, and the router configured to block requests transmitted from the server to the image forming apparatus;
   a storage; and
   a control device configured to execute:
      a first receiving process of receiving a first request including inquiry information related to acquisition of notification data, from the image forming device through the communication interface;
      in response to receiving the first request, a determination process of determining whether the server is permitted to collect a collection data of the image forming device, the collection data being necessary for generating the notification data;
      when it is determined that the server is not permitted to collect data, a first transmitting process of transmitting, to the image forming device through the communication interface, a first response including first permission information for checking whether a user of the image forming device permits data collection;

after the server transmits the first response, a second receiving process of receiving a second request including second permission information representing that the user permits data collection, from the image forming device through the communication interface;

in response to receiving the second request, a second transmitting process of transmitting a second response including active information for activating a data collecting function of the image forming device to the image forming device through the communication interface;

after the server transmits the second response, a third receiving process of receiving a third request including device identification information for identifying the image forming device, from the image forming device through the communication interface;

in response to receiving the third request, a third transmitting process of storing the received device identification information in the storage, and transmitting, to the image forming device through the communication interface, a third response including instruction information for instructing the image forming device to transmit the data which should be collected by the data collecting function, the instruction information including cycle information representing transmission cycle of the collection data, authentication information necessary for enabling the server to receive the collection data, and deadline information representing expiration date of the authentication information, the cycle information causing the image forming device to transmit the collection data every time the transmission cycle elapses;

a fourth receiving process of receiving a fourth request including the collection data from the image forming device through the communication interface using the authentication information included in the instruction information; and a storage control process of storing the received the collection data in the storage in association with the device identification information when the server receives the collection data according to the fourth receiving process.

2. The server according to claim 1, wherein the control device further configured to execute:

a storing process of storing the device identification information and the second permission information in association with each other in the storage when the second permission information including the device identification information is received, according to the second receiving process; and a determining process of determining that the data collection is permitted when the inquiry information including the device identification information is received, according to the first receiving and the second permission information is stored in the storage in association with the device identification information included in the inquiry information.

3. The server according to claim 1, wherein when the device identification information is received according to the third receiving process, the control device is configured to transmit the instruction information including data identification information for identifying collection data, to the image forming device through the communication interface, and when the data identification information and the collection data are received according to the fourth receiving process, the control device is configured to store the data identification information and the collection data in association with each other in the storage.

4. The server according to claim 1, wherein:
the first permission information includes information defining a permission receiving screen for prompting the user of the image forming device to perform a user operation for permitting data collection, and
the second permission information includes information representing that the user operation is performed in the image forming device which displays the permission receiving screen.

5. The server according to claim 1, wherein the control device includes:
a first control device configured to execute the determination process, the first transmitting process and the second transmitting process; and
a second control device configured to execute the third transmitting process and the storage control process,
the server includes a first server and a second server, the first server includes the first control device, the second server includes the second control device; and
the second transmitting process causes the first control device to transmit, to the image forming device, the active information including location information representing a location of the second device which is a transmission source of the request information.

6. The server according to claim 5, wherein the storage is connected to a communication network connected to the first control device and the second control device, and is accessed from the first control device and the second control device through the communication network.

7. The server according to claim 1, wherein
the collection data includes data related to a replacement component which is consumed according to an operation of the image forming device,
the notification data includes data for prompting the user to purchase a new replacement component, and
when it is determined according to the determination process that data collection is permitted and the notification data is stored in the storage, the control device is configured to execute a notification process of transmitting the notification data to the image forming device through the communication interface.

8. The server according to claim 7, wherein
the control device is configured to execute:
a fifth receiving process of receiving an output instruction for outputting the collection data, an outputting process of outputting the collection data stored in the storage; and
when the server acquires the notification data, an acquiring process of storing the acquired notification data in the storage.

9. The server according to claim 7, wherein
the notification process causes the control device to transmit, to the image forming device through the communication interface, the notification data for instructing a recorder of the image forming device to record an image on a sheet, the image representing a discount coupon for discounting the purchase price of the replacement component.

10. An image forming device belonging to a LAN which is connected to the Internet through a router, the router configured to pass requests transmitted from the image forming device to a server, the router configured to pass responses transmitted from the server to the image forming device, and the router configured to block requests transmitted from the server to the image forming apparatus, the image forming device comprising:
- a communication interface configured to perform communication with a server on the Internet through the router;
- a display configured to display an image;
- an operation device configured to receive an operation of a user; and
- a control device configured to execute:
  - a first receiving process of receiving, by the operation device, the operation of the user regarding acquisition of notification data which is generated based on collection data collected from the image forming device;
  - an inquiring process of transmitting a first request including inquiry information regarding the acquisition of the notification data to the server through the communication interface when the operation is received by the operation device according to the first receiving process;
  - in response to transmitting the first request, a second receiving process of receiving, by the image forming device, from the server through the communication interface, a first response including first permission information for checking whether the user of the image forming device permits data collection;
  - when the first permission information is received in response to the second receiving process, a display control process of controlling the display to display a permission receiving screen for prompting the user to perform a user's operation to permit data collection;
  - a third receiving process of receiving, by the operation device, the user's operation to permit data the collection;
  - when the user's operation is received according to the third receiving process, a permission confirming process of transmitting, to the server through the communication interface, a second request including second permission information representing that data collection is permitted;
  - a fourth receiving process of receiving, by the image forming device, from the server through the communication interface, a second response including active information for activating a data collecting function;
  - in response to receiving the second response, a requesting process of transmitting, to the server through the communication interface, a third request including device identification information for identifying the image forming device;
  - a fifth receiving process of receiving, from the server through the communication interface, a third response including instruction information for instructing the image forming device to transmit data which should be collected, as a response to the request information, the instruction information including cycle information representing transmission cycle of the collection data, authentication information necessary for enabling the server to receive the collection data, and deadline information representing expiration date of the authentication information; and
  - a collecting process of transmitting collection data collected from the image forming device, to the server through the communication interface using the authentication information included in the instruction information, wherein the image forming device executes the collecting process every time the transmission cycle elapses, wherein when the transmission cycle elapses and the expiration date comes, the control device is configured to perform a re-transmission requesting process of transmitting re-transmission request information for requesting transmission of new authentication information to the server through the communication interface, and wherein when the image forming device receives the new authentication information from the server through the communication interface, the control device executes the collecting process using the new authentication information.

11. The image forming device according to claim 10, wherein
the fifth receiving process causes the image forming device to receive, from the server through the communication interface, the instruction information including data identification information for identifying the collection data, and
the collecting process causes the image forming device to transmit the collection data identified by the data identification information to the server through the communication interface.

12. The image forming device according to claim 10 further comprising:
a recorder configured to record an image on a sheet,
wherein the collection data includes data related to a replacement component which is consumed according to an operation of the image forming device, and
the image forming device is configured to execute:
  a sixth receiving process of receiving the notification data representing a coupon image representing a discount coupon for discounting the purchase price of the replacement component, from the server through the communication interface; and
  a recording process of controlling the recorder to record the coupon image on the sheet when the notification data is received according to the sixth receiving process.

13. A non-transitory computer readable recording medium storing a program which is executable by a computer having a storage and a communication interface for performing communication with an image forming device through an Internet, the image forming device belonging to a LAN which is connected to the Internet through a router, the router configured to pass requests transmitted from the image forming device to a server, the router configured to pass responses transmitted from the server to the image forming device, and the router configured to block requests transmitted from the server to the image forming apparatus, the program causing the computer to execute:
  a first receiving process of receiving, by the server, a first request including inquiry information related to acquisition of notification data from the image forming device through the communication interface
  in response to receiving the first request, a determination process of determining whether the server is permitted to collect data of the image forming device;
  when it is determined that the server is not permitted to collect data, a first transmitting process of transmitting, to the image forming device through the communication interface, a first response including first permission information for checking whether a user of the image forming device permits data collection;

after the server transmits the first response, a second receiving process of receiving, by the server from the image forming device through the communication interface, a second request including second permission information representing that the user permits data collection;

in response to receiving the second request, a second transmitting process of transmitting active information for activating a data collecting function of the image forming device to the image forming device through the communication interface;

after the server transmits the second response, a third receiving process of receiving, from the server, a third request including device identification information for identifying the image forming device of which data collecting function is activated from the image forming device through the communication interface;

in response to receiving the third request, a third transmitting process of storing the received device identification information in the storage, and transmitting a third response including instruction information for instructing the image forming device to transmit the data which should be collected, to the image forming device through the communication interface when the device identification information is received by the third receiving process, the instruction information including cycle information representing transmission cycle of the collection data, authentication information necessary for enabling the server to receive the collection data, and deadline information representing expiration date of the authentication information, the cycle information causing the image forming device to transmit the collection data every time the transmission cycle elapses;

a fourth receiving process of receiving a fourth request including the collection data for generating the notification data from the image forming device through the communication interface by the server using the authentication information included in the instruction information; and a storage control process of storing the received collection data in the storage in association with the device identification information when the collection data is received according to the fourth receiving process.

14. A communication system comprising:
a router;
an image forming device belonging to a LAN which is connected to the Internet through the router, the image forming device including:
an operation device for receiving operations of a user;
a first communication interface;
a first control device; and
a server including:
a storage;
a second communication interface configured to communicate with the first communication interface through the Internet and the router; and
a second control device,
wherein the router is configured to pass requests transmitted from the image forming device to the server, the router is configured to pass responses transmitted from the server to the image forming device, and the router is configured to block requests transmitted from the server to the image forming apparatus, wherein:
the first control device is configured to execute:
a first receiving process of receiving, by the operation device, the operation of the user regarding acquisition of notification data which is generated based on collection data collected from the image forming device;
when the operation is received according to the first receiving process, an inquiring process of transmitting a first request including inquiry information regarding the acquisition of the notification data to the server through the communication interface;
a second receiving process of receiving, by the image forming device, from the server through the communication interface, a first response including first permission information for checking whether the user of the image forming device permits data collection;
in response to receiving the first response, a display control process of controlling the display to display a permission receiving screen for prompting the user to perform a user's operation to permit data collection;
a third receiving process of receiving, by the operation device, the user's operation to permit data the collection;
when the user's operation is received according to the third receiving process, a permission confirming process of transmitting, to the server through the communication interface, a second request including second permission information representing that data collection is permitted;
a fourth receiving process of receiving, by the image forming device, from the server through the communication interface, a second response including active information for activating a data collecting function;
in response to receiving the second response, a requesting process of transmitting, to the server through the communication interface, a third request including request information including device identification information for identifying the image forming device;
a fifth receiving process of receiving, from the server through the communication interface, a third response including instruction information for instructing the image forming device to transmit data which should be collected, as a response to the request information, the instruction information including cycle information representing transmission cycle of the collection data, authentication information necessary for enabling the server to receive the collection data, and deadline information representing expiration date of the authentication information; and
a collecting process of transmitting a fourth request including collection data collected from the image forming device, to the server through the communication interface using the authentication information included in the instruction information, and
the second control device is configured to execute:
a sixth receiving process of receiving, by the server, the first request including the inquiry information from the image forming device through the second communication interface;

in response to receiving the first request, a determining process of determining whether the server is permitted to collect data of the image forming device;

when it is determined that the server is not permitted to collect data, a first transmitting process of transmitting the first response including the first permission information to the image forming device through the second communication interface;

a seventh receiving process of receiving, by the server, the second request including the second permission information from the image forming device through the second communication interface;

in response to receiving the second request, a second transmitting process of transmitting the second response including the active information to the image forming device through the second communication interface;

an eighth receiving process of receiving, by the server, the third request including the request information from the image forming device through the second communication interface;

in response to receiving the third request, a third transmitting process of storing in the storage the device identification information included in the request information and transmitting the instruction information to the image forming device through the second communication interface;

a ninth receiving process of receiving, by the server, the fourth request including the collection data from the image forming device through the second communication interface; and a storing control process of storing the received collection data in association with the device identification information in the storage when the collection data is received according to the ninth receiving process, wherein the image forming device executes the collecting process every time the transmission cycle elapses, wherein when the transmission cycle elapses and the expiration date comes, the control device is configured to perform a re-transmission requesting process of transmitting re-transmission request information for requesting transmission of new authentication information to the server through the communication interface, and wherein when the image forming device receives the new authentication information from the server through the communication interface, the control device executes the collecting process using the new authentication information.

* * * * *